UNITED STATES PATENT OFFICE.

ERNST KRAUSE, OF STEGLITZ, NEAR BERLIN, AND HANS BLÜCHER, OF LEIPZIG-GOHLIS, GERMANY, ASSIGNORS, BY MESNE ASSIGNMENTS, TO THE CHEMICAL FOUNDATION, INC., A CORPORATION OF DELAWARE.

PLASTIC MASS AND PROCESS FOR MAKING SAME.

1,319,666.  Specification of Letters Patent.  Patented Oct. 21, 1919.

No Drawing.   Application filed August 20, 1915.   Serial No. 46,587.

*To all whom it may concern:*

Be it known that we, ERNST KRAUSE, a subject of the King of Bavaria, residing at Steglitz, near Berlin, Germany, and HANS BLÜCHER, a subject of the King of Saxony, and residing at Leipzig-Gohlis, Germany, have invented certain new and useful Improvements in Plastic Masses and Processes for Making Same; and we do hereby declare the following to be a full, clear, and exact description of the invention, such as will enable others skilled in the art to which it appertains to make and use the same.

This invention relates to a plastic mass to be used as a substitute for horn, ebonite, celluloid, galalith or the like, and to the process for making same.

The invention is based upon the fact ascertained by us that residues of yeast, and more especially the residues resulting from the production of nutritive extracts from yeast can be converted into plastic masses by reacting upon them with aldehydes and more especially with formaldehyde. The residues mentioned above substantially consist of albuminous residues of the yeast plasma and including the walls of the cells of the depleted yeast particles and albuminoid bodies.

Although it was not to be expected that the process could be carried out as well with fresh yeast not yet used for the production of extracts, we have ascertained by experiment that it is quite feasible to produce plastic masses from the yeast direct, the albumin of the yeast participating as a whole in the reaction with aldehydes and being adapted to be used for the manufacture of substitutes for horn, celluloid and the like. We have found, however, that it is necessary, if fresh yeast is used, to materially reduce the percentage of water.

It is obvious that other albuminous substances reacting with aldehydes, and any kind of filling materials may be added to the yeast pulp.

The properties of the plastic masses obtained can further be varied within wide limits by adding to the mixture tar or tar oils. However these additions do not only act mechanically upon the product obtained in affecting its physical properties, but will also exercise a chemical influence, the aldehydes and ketones contained therein being able to react with the yeast, just like the aldehydes added to this purpose, and to replace these aldehydes partly or altogether. An addition of tar residues, of pitch, or sulfur will equally have an influence upon the mass obtained, as far as its physical properties are concerned. The phenols contained in the tar also take part in the reaction and in the production of the plastic mass, their capacity of reacting with aldehydes and more especially with formaldehyde being well known.

A further addition adapted to react with aldehydes and more especially with formaldehyde, and which may advantageously be reacted upon by such aldehydes together with the yeast or residues of yeast, the phenols and other substances added, is casein. It is old to allow casein to enter into reaction with aldehydes and more especially with formaldehyde with a view to rendering it insoluble in water. In the present instance it is of great value as an addition allowing a variation in the properties of the mass mainly prepared from yeast and aldehydes.

In practising our invention we prefer dehydrating as far as possible the masses of yeast treated with aldehydes, such as for instance formaldehyde and its polymerids, and to subject the dehydrated masses to the combined action of heat and pressure. In order to dehydrate the mass, a number of different methods may be employed. Thus in the case of yeast or yeast residues being treated without any additions, they are reacted upon with formaldehyde and the product obtained is simply concentrated and dried. If mixtures of albuminous substances capable of being precipitated and of yeast are employed, one may first of all precipitate the mixture, for instance by boiling and coagulation, if albumin is used, the coagulated albumin causing the yeast to be precipitated also. The precipitate is then dehydrated and dried as far as possible, after having been treated with formaldehyde, and is then molded under the action of heat and pressure. It is essential to heat to about 90° C. or more during the pressing operation.

The method may further be practised with dry yeast, thus making it independent from the place of production of the yeast, dry yeast being sufficiently stable to allow of being transported over long distances and offering the further advantage of weighing little on account of its being free of water. We wish it to be understood that the dry yeast here referred to is not pressed yeast but real dried yeast dehydrated, by any suitable method, so as to form a dry powder. The dry yeast is treated with formaldehyde by moistening it with an aqueous solution of formaldehyde or by treating it with formaldehyde gas or mixing it with a polymerid of formaldyhyde such as for instance paraform. The raw material thus obtained is then dried, if aqueous formaldehyde solution had been used, and subjected to the action of heat and pressure. Of course all kinds of additions may be made during this stage of the process, such additions acting merely as filling substances or else reacting with the formaldehyde; substances of this latter type are for instance bituminous substances, glue, phenols and other tar products.

Example I: 1000 parts of yeast pulp containing 15 per cent. dry substance are heated, in order to kill the yeast, and mixed with 150 parts of a 40 per cent. solution of formaldehyde. The mixture is dried at a moderate temperature and is then subjected to a pressure of 150 atmospheres at 95 degr. C. in a press provided with heating appliances.

Example II: 1000 parts of yeast pulp containing 15 per cent. dry substance are mixed with 150 parts of a 40 per cent. solution of formaldehyde and 15 parts of coaltar, the yeast having previously been killed by heating. The mixture is dried under continuous stirring and is then molded in a press adapted to be heated under a pressure of 50 atmospheres and at 95 degr. C.

Example III: 1000 parts of yeast pulp containing 15 per cent. dry substance are mixed with 150 parts of a 40 per cent. solution of formaldehyde and the mixture is dried. To the ground product are added 15 parts of heavy tar-oil and 5 parts of pitch and the whole is then subjected to a pressure of more than 150 atmospheres at more than 90 degr. C. in a press adapted to be heated.

Example IV: 1000 parts of yeast pulp are mixed with 15 parts of phenol and 150 parts of a 40 per cent. solution of formaldehyde. The mixture is dried, ground and molded at 95 degr. C. in a press adapted to be heated, the pressure employed being above 150 atmospheres.

Example V: 1000 parts of yeast pulp containing 15 per cent. of dry substance are mixed and boiled with 50 parts of casein, either solid or in solution. The mixture is then treated with 160 parts of a 40 per cent. formaldehyde solution, dried and subjected to pressure at temperatures above 90 degr. C.

Example VI: 1000 parts of yeast pulp containing 15 per cent. of dry substance are homogeneously mixed and boiled with a watery solution of 20 parts of albumin. The precipitate obtained by coagulation and containing also the yeast is filtered and mixed with 175 parts of a 40 per cent. solution of formaldehyde. The mixture is dried and molded at temperatures above 95 degr., a pressure of more than 150 atmospheres being applied.

Example VII: 1000 parts of yeast pulp containing 15 per cent. of dry substance are mixed with a watery solution of 20 parts of blood albumin and coagulated by boiling. The precipitate is mixed with 175 parts of a 40 per cent. solution of formaldehyde. The mixture is dried and mixed with 10 parts of powdered glue, to which may be added 75 parts of colophony and 8 parts of celluloid. This mixture is dried and molded at temperatures above 95 degr. C., the pressure applied being above 150 atmospheres.

Example VIII: 1000 parts of dry yeast are stirred with 600 parts of a 40 per cent. solution of formaldehyde. The mixture is dried, is then ground, if necessary and is molded under a pressure of 200 atmospheres and at a temperature of at least 90 degr. C.

Example IX: 1000 parts of dry yeast are mixed with 200 parts of dry casein; the mixture is stirred with 720 parts of a 40 per cent. formaldehyde solution, the resulting mass is dried and subjected either in a coarse-grain condition or, if desired, in pulverized state to a temperature of at least 90 degr. C and a molding pressure above 150 atmospheres.

Example X: 1000 parts of dry yeast are intimately mixed with 250 parts of paraform and the mixture is then molded under a pressure of at least 100 atmospheres at a temperature of from 120 to 160 degr. C.

The term "formaldehyde" as used in the claims is meant to include also aldehydes other than formaldehyde, substances, such as coal-tar and its products, containing aldehydes, and further all the polymers of formaldehyde and of other aldehydes.

By this method there is produced a mass product from the reaction of yeast and formaldehyde subjected to heat and high pressure, said product varying in its physical characteristics in accordance with the reacting conditions and characterized by its insolubility in alcohol, acetone, alkalis and most other solvents.

We claim:—

1. The process for making plastic masses which consists in treating yeast with formaldehyde and subjecting the product resulting from such treatment to the combined action of heat and high pressure.

2. The process for making plastic masses which consists in treating dry yeast with formaldehyde and subjecting the product resulting from such treatment to the combined action of heat and high pressure.

3. The process for making plastic masses which consists in treating a mixture of yeast and other albuminous substances with formaldehyde and subjecting the product resulting from such treatment to the combined action of heat and high pressure.

4. The process for making plastic masses which consists in treating a mixture of yeast and suitable filling materials with formaldehyde and subjecting the product resulting from such treatment to the combined action of heat and high pressure.

5. The process of making plastic masses consisting in coagulating a mixture of yeast and a filler and then treating the product with formaldehyde in the presence of both heat and high pressure.

6. The process for making plastic masses which consists in subjecting a mixture of yeast and other substances to treatment to effect coagulation, drying the precipitate obtained, reacting upon it with formaldehyde and subjecting the resulting mass to the combined action of heat and pressure.

7. The herein described plastic mass resulting from the reaction of yeast and formaldehyde under the combined action of heat and high pressure, said product varying in its physical characteristics in accordance with the reacting conditions and characterized with its insolubility in alcohol, acetone, alkalis and most other solvents.

In witness whereof we have hereunto set our hands in the presence of two witnesses.

ERNST KRAUSE.
HANS BLÜCHER.

Witnesses for Ernst Krause:
   WOLDEMAR HAUPT,
   HENRY HASPER.
Witnesses as to Hans Blücher:
   RUDOLPH FRICKE,
   MARGARETE FRITZSCHE.